(12) United States Patent
Hessabi

(10) Patent No.: US 6,541,153 B2
(45) Date of Patent: Apr. 1, 2003

(54) ELECTRICAL POWER GENERATOR

(76) Inventor: Iradj Hessabi, 685 Great Dane, Henderson, NV (US) 89052

( * ) Notice: Subject to any disclaimer, the term of this patent is extended or adjusted under 35 U.S.C. 154(b) by 92 days.

(21) Appl. No.: 09/794,930

(22) Filed: Feb. 28, 2001

(65) Prior Publication Data

US 2002/0119369 A1 Aug. 29, 2002

(51) Int. Cl.$^7$ .................. H01M 2/02; H01M 6/42; H01M 2/20; H01M 4/38; H01M 4/42
(52) U.S. Cl. .................. 429/149; 429/160; 429/161; 429/164; 429/176; 429/208; 429/220; 429/229
(58) Field of Search .................. 429/149, 160, 429/161, 164, 175, 208, 220, 229, 163, 176

(56) References Cited

U.S. PATENT DOCUMENTS

| | | | | |
|---|---|---|---|---|
| 2,185,756 A | * | 1/1940 | Spicer | 362/171 |
| 3,765,943 A | * | 10/1973 | Biagetti | 141/32 |
| 4,560,631 A | * | 12/1985 | Nishihama et al. | 429/224 |
| 5,523,178 A | * | 6/1996 | Murakami et al. | 429/53 |
| 5,925,482 A | * | 7/1999 | Yamashita | 429/130 |
| 6,261,717 B1 | * | 7/2001 | Luo et al. | 429/164 |

* cited by examiner

Primary Examiner—Patrick Ryan
Assistant Examiner—Jonathan Crepean
(74) Attorney, Agent, or Firm—Leonard Weiss

(57) ABSTRACT

An electrical power generator includes a plastic cylindrical case that has an interior divided into a plurality of chambers. A copper electrode and a zinc electrode are disposed within each of the chambers. The copper electrodes have a positive electromotive force. The zinc electrodes have a negative electromotive force. The electrodes are in a circuit arrangement that has a negative terminal and a positive terminal. The negative output and a positive output terminals are respectively connected to the positive and negative outputs of the generator.

9 Claims, 2 Drawing Sheets

ELECTRICAL POWER GENERATOR

BACKGROUND OF THE INVENTION

1. Field of Invention

The present invention relates generally to a source of electrical energy and, more specifically, to generation of direct current electrical energy.

2. Description of the Prior Art

Batteries are the most commonly used electrical power source. They consist of cells in which chemical energy is converted into electrical energy. Each cell is a container having therein a negative electrode, a positive electrode, an electrolyte solution and electrode separators.

The negative electrode is in what is referred to as a reduced state whereas the positive electrode is in what is referred to as an oxidized state. When the cell is operating, the negative electrode yields electrons through an external circuit to the positive electrode whereby the negative electrode is oxidized and the positive electrode is reduced. The electrons are carried through the cell by ions of the electrolyte solution.

Two types of batteries are known, namely a primary battery and a secondary battery. In the primary battery, the oxidation and reduction cannot be efficiently reversed. This is not the case for the secondary battery, however, which are often referred to as a storage battery because of the reversibility.

The primary battery has a limited useful life; it is discarded upon depletion of its electrical energy. The primary battery is not easily recyclable; it contributes to environmental pollution. The secondary cell has a longer useful life because of the reversibility of the oxidation and reduction, but they are heavy and utilize strong acids thereby making their disposal an environmental pollution problem.

Accordingly, there is a need for a source of direct current electrical energy that has a long useful life and does not contribute to environmental pollution.

SUMMARY OF THE INVENTION

According to the present invention, a plastic container has a plurality of chambers. Within each chamber is an electrode pair immersed in a liquid medium. The electrode pair includes a negative electrode and a positive electrode. The negative electrode has a greater electromotive force than the positive electrode.

Other objects, features and advantages of the invention should be apparent from the following description of a preferred embodiment as illustrated in the accompanying drawing.

DESCRIPTION OF THE PREFERRED EMBODIMENT

Figure 1:
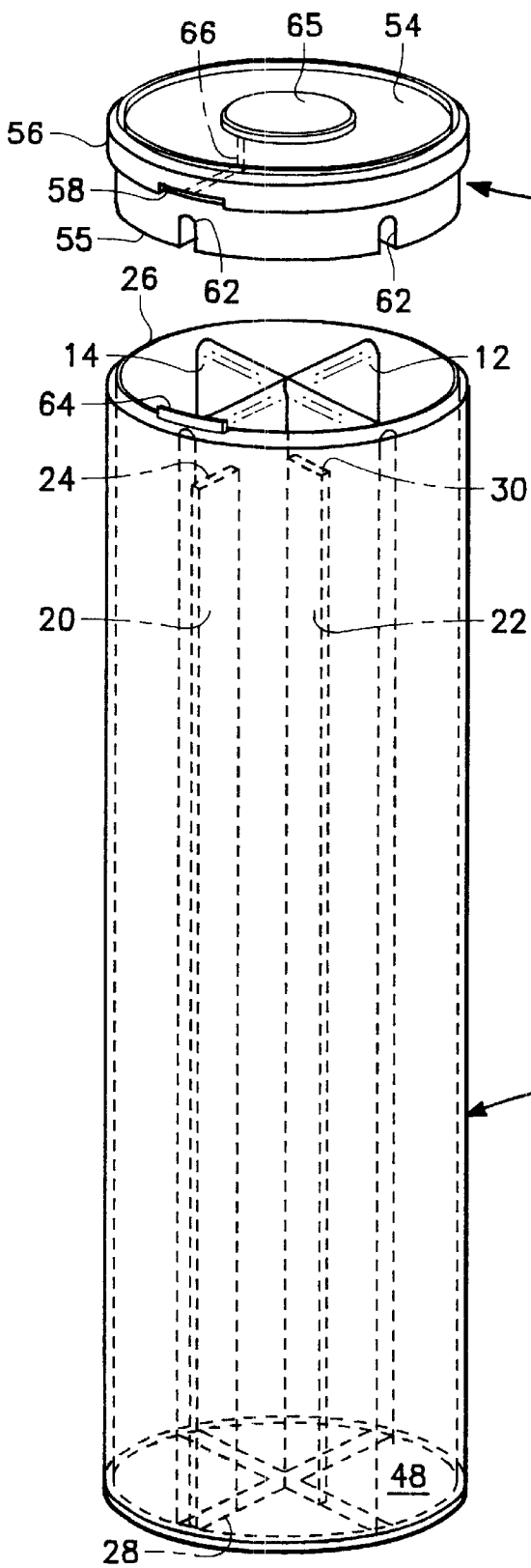
FIG. 1 is a perspective, partially exploded, view of an electrical power generator of the preferred embodiment of the present invention.
Figure 2:
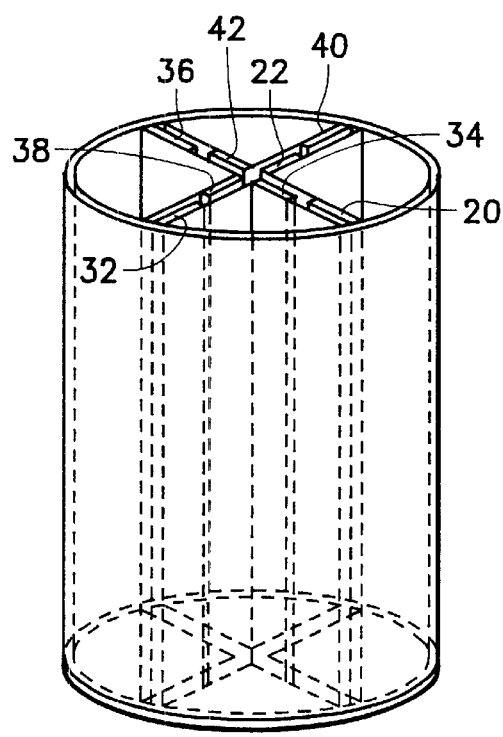
FIG. 2 is a perspective view of a lower part of the power generator of FIG. 1.
Figure 3:
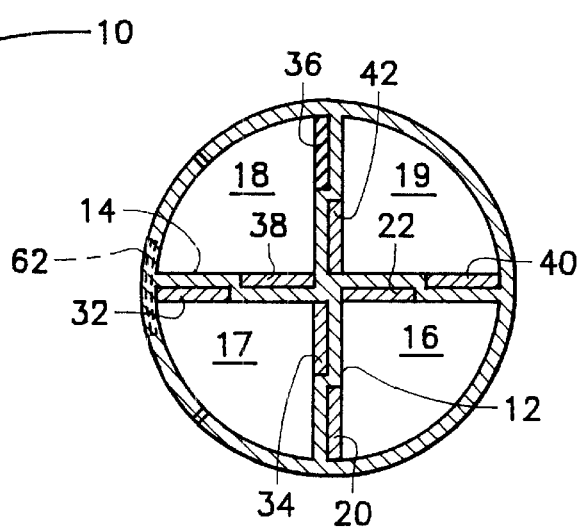
FIG. 3 is a plan view of chambers of the power generator of FIG. 1.

As shown in FIGS. 1–3, a generator is comprised of a cylindrical plastic case 10 (FIG. 1) that is open at one end. Within the case 10 are intersecting plastic walls 12,14, whereby the interior of the case 10 is divided into chambers 16–19 (FIG. 3) It should be understood that neither the case 10 nor the walls 12, 14 are electrically conductive.

Within the chamber 16 is an electrode pair comprised of a positive electrode 20 and a negative electrode 22 that have a negative electromotive force and a positive electromotive force, respectively. The negative electromotive force is greater than the positive electromotive force.

More particularly, the electrode 20 is a copper strip that is disposed within a recess in the wall 12. The recess in the wall 12 is near a wall of the case 10 and extends from a location 24 that is proximal to an open end 26 of the case 10 to a closed bottom end 28 of the case 10.

The electrode 22 is a zinc strip that is disposed within a recess in the wall 14. The recess in the wall 14 is near an intersection of the walls 12, 14 and extends from a location 30 that is proximal to the open end 26 to the bottom 28.

Within the chamber 17 is an electrode pair comprised of a copper electrode 32 and a zinc electrode 34 that are disposed within recesses in the walls 14, 12, respectively. The disposition of the electrodes 32,34 within the chamber 17 is analogous to the disposition of the electrodes 20, 22, respectively.

Correspondingly, within the chamber 18 is an electrode pair comprised of a copper electrode 36 and a zinc electrode 38 that are disposed within recesses in the walls 12, 14, respectively. The disposition of the electrodes 36, 38 is analogous to the disposition of the electrodes 20, 22, respectively.

Similar to the chambers 16–18, within the chamber 19 is an electrode pair comprised of a copper electrode 40 and a zinc electrode 42 that are disposed within recesses in the walls 14, 12, respectively. The disposition of the electrodes 40, 42 is analogous to the disposition of the electrodes 20, 22, respectively.

The chambers 16–19 have therein a liquid medium that immerse at least 0.1 millimeters of the electrodes 20, 22, 34, 32, 36, 38, 40, 42. Preferably, the liquid is tap water. Alternatively, the liquid medium is an organic liquid with a conductance greater than approximately $10^{-6}$ mho. When the chambers 16–19 have the liquid therein, the generator is operable to provide an electrical output.

Figure 4:
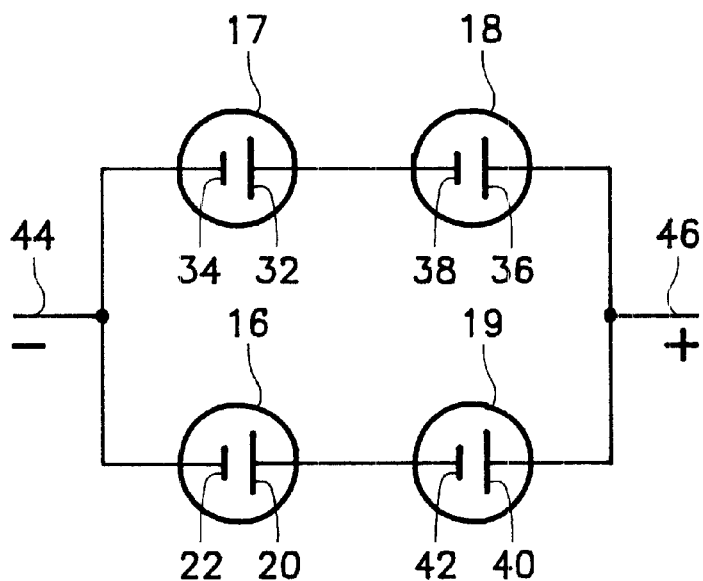
FIG. 4 is a schematic showing of how electrodes of the generator of FIG. 1 are connected to provide a series-parallel circuit arrangement.

As shown in FIG. 4, a series-parallel circuit arrangement, for example, is achieved when the electrodes 32, 38 are conductively connected and the electrodes 20, 42 are conductively connected. The electrodes 22, 34 are conductively connected to form a negative terminal 44 of the series-parallel arrangement.

The electrodes 36, 40 are conductively connected to form a positive terminal 46 of the series-parallel arrangement. As explained hereinafter, the terminals 44, 46 are connected to outputs of a negative output and a positive output, respectively, of the generator.

The generator has a capability of providing more current than could be provided by a single electrode pair because of a parallel aspect of the series-parallel arrangement. Additionally. The generator has a capability of providing more voltage than could by provided by a single electrode pair because of a series aspect of the series-parallel arrangement.

On the exterior of the container 10 is a disc shaped metal plate 48 is mounted on the bottom 28. The plate 48 forms the negative output of the generator. The negative terminal 44 is connected through a wire (not shown) to the plate 48.

A plastic cap 50 of the generator has a cylindrical body 52 that has a closed end 54 and an open end 55. Proximal to the closed end 54 is a lip 56 with a socket 58 mounted therein.

The end 55 has notches 62 therein. Additionally, a metal plug 64 is mounted on the open end 26. The plug 64 is connected to the positive terminal 46.

When the cap 50 is installed, the cylindrical body 52 fits into the case 10 with tops of the walls 12, 14 fitted into the notches 62 and the plug 64 within the socket 58 thereby providing an electrically conductive path from the positive terminal 46 to the socket 58.

An output disc 65 is centrally disposed atop the closed end 54. The disc 65 is connected through a wire 66 to the socket 58. Therefore, there is an electrically conductive path from the terminal 46 to the disc 65.

Figure 5:
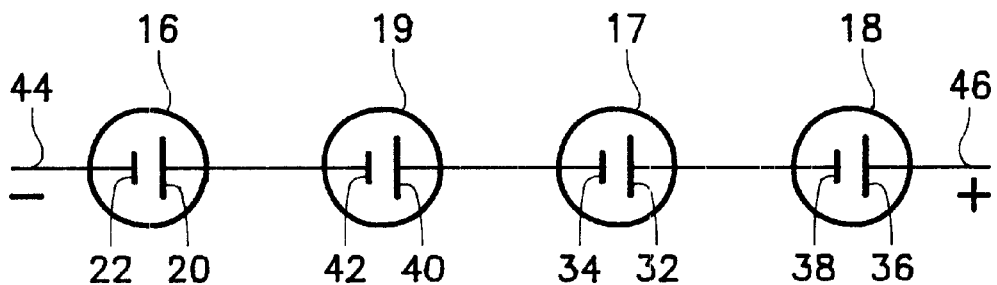
FIG. 5 is a schematic showing of how electrodes of how electrodes of FIG. 1 are connected to provide a series circuit arrangement.

As shown in FIG. 5, in another example, a series circuit arrangement is achieved when the electrodes 32, 38, are conductively connected. In a similar manner, the electrodes 34, 40 and the electrodes 42, 20 are electrically connected. The positive terminal 46 and the negative terminal 44 are connected to the electrodes 46, 44, respectively. The series circuit arrangement has a capability of providing a higher voltage at a reduced current compared with what is attainable with the series-parallel arrangement.

While the invention has been particularly shown and described with reference to a preferred embodiment, it should be understood by those skilled in the art that changes in form and detail may be made therein without departing from the spirit and scope of the invention.

I claim:

1. An electrical power generator comprising:
   a plastic cylindrical case that is open at one end and closed at the other end;
   intersecting walls that divide the interior of said case into a plurality of chambers;
   a liquid medium within said chambers; and
   an electrode pair disposed within each of said chambers, one electrode of each pair having a positive electromotive force and the other having a negative electromotive force, electrodes of a pair of electrodes within a given chamber are disposed within recesses in first and second walls, respectively, of said given chamber.

2. The electrical power generator of claim 1 where said liquid medium immerses at least 0.1 millimeters of said electrodes.

3. The electrical power generator of claim 1 wherein said liquid medium is tap water.

4. The electrical power generator of claim 1 wherein said liquid medium is an organic liquid with a conductance greater than approximately $10^{-6}$ mho.

5. The electrical power generator of claim 1 wherein said negative electromotive force is greater than said positive electromotive force.

6. The electrical power generator of claim 5 wherein electrodes with the negative electromotive force are zinc and electrodes with the positive electromotive force are copper.

7. The electrical power generator of claim 1 wherein said electrodes are connected in a circuit arrangement that has a negative output terminal and a positive output terminal, additionally comprising:
   a disc shaped metal plate mounted on the exterior of said closed end and connected to the negative output terminal, said plate forming a negative output of said generator;
   a plug mounted on the open end of said case and connected to the positive output terminal;
   a cap having a cylindrical body with a closed end; and
   a socket mounted within a lip that is proximal to said closed end of said cap; and
   an output disc mounted atop said closed end of said cap and electrically connected to said socket, when said cylindrical body of said cap is inserted into the open end of said case with said plug within said socket, said output disc forms a positive output of said generator.

8. The electrical power generator of claim 7 wherein said circuit arrangement is a series-parallel circuit arrangement.

9. The electrical power generator of claim 7 wherein said circuit arrangement is a series circuit arrangement.

* * * * *